(12) United States Patent
Peters et al.

(10) Patent No.: US 9,848,592 B2
(45) Date of Patent: Dec. 26, 2017

(54) AGRICULTURAL SPRAY BOOM

(71) Applicant: Speciality Enterprises, LLC, Wautoma, WI (US)

(72) Inventors: Michael D. Peters, West Bend, WI (US); Peter J. Heinen, Kewaskum, WI (US); Roy Venton-Walters, Neshkoro, WI (US); Gregory Jackson Klemp, Jr., Neshkoro, WI (US)

(73) Assignee: Specialty Enterprises, LLC, Wautoma, WI (US)

( * ) Notice: Subject to any disclaimer, the term of this patent is extended or adjusted under 35 U.S.C. 154(b) by 570 days.

(21) Appl. No.: 14/098,423

(22) Filed: Dec. 5, 2013

(65) Prior Publication Data
US 2014/0366460 A1 Dec. 18, 2014

Related U.S. Application Data

(60) Provisional application No. 61/834,412, filed on Jun. 12, 2013.

(51) Int. Cl.
*A01M 7/00* (2006.01)

(52) U.S. Cl.
CPC ........ *A01M 7/0075* (2013.01); *A01M 7/0071* (2013.01); *A01M 7/0078* (2013.01)

(58) Field of Classification Search
CPC .............. A01M 7/0071; A01M 7/0075; A01M 7/0053; A01M 7/0078
See application file for complete search history.

(56) References Cited

U.S. PATENT DOCUMENTS

| | | | | |
|---|---|---|---|---|
| 5,992,759 A | * | 11/1999 | Patterson | A01C 23/00 239/159 |
| D559,274 S | * | 1/2008 | Chahley | D15/13 |
| 2004/0238659 A1 | * | 12/2004 | Wubben | A01M 7/0075 239/166 |
| 2006/0201075 A1 | * | 9/2006 | Rivas | A01M 7/0071 52/111 |
| 2007/0131791 A1 | * | 6/2007 | Peterson | A01M 7/0078 239/166 |

(Continued)

OTHER PUBLICATIONS

Pommier Scebp, web site print out of www.pommier-scebp.com/en/spray-booms-c2.html, 5 pages as viewed on Dec. 22, 2014.

*Primary Examiner* — Adriana Figueroa
*Assistant Examiner* — Jessie T Fonseca
(74) *Attorney, Agent, or Firm* — Brannen Law Office, LLC

(57) ABSTRACT

An improved agricultural spray boom having a primary section, a secondary section and a break away section is provided. The primary section has a top extrusion having a web and two tubes, each tube having a heat sink and a wing. No welds are located above the centerline of the tubes where stress would be the greatest. The secondary section is pivotally attached to the primary section. Weight of the second section and break away section cause a twisting force to be applied to the primary section. The primary section has specially oriented side braces which act in compression to resist the twisting force. The primary section further has a steel connector connected to the underside of the extrusions (and not welded to top of extrusions). The secondary section also has a top extrusion with a web and two tubes.

18 Claims, 14 Drawing Sheets

(56) References Cited

U.S. PATENT DOCUMENTS

| | | | |
|---|---|---|---|
| 2012/0273590 A1* | 11/2012 | Honermann | A01M 7/0071 239/159 |
| 2012/0273626 A1* | 11/2012 | Bouten | A01M 7/0071 248/70 |
| 2013/0062432 A1* | 3/2013 | Barker | A01M 7/0071 239/159 |
| 2013/0092753 A1* | 4/2013 | Barker | A01M 7/0075 239/163 |
| 2014/0263766 A1* | 9/2014 | Venton-Walters | A01G 25/09 239/726 |

* cited by examiner

AGRICULTURAL SPRAY BOOM

This United States utility patent application claims priority on and the benefit of provisional application 61/834,412 filed Jun. 12, 2013, the entire contents of which are hereby incorporated herein by reference.

BACKGROUND OF THE INVENTION

1. Field of the Invention

The present invention relates to an agricultural spray boom, and in particular to an agricultural spray boom that resists twisting in the primary section, that has improved top extrusions and has an improved attachment structure.

2. Description of the Related Art

Many agricultural spray booms presently exist. It is common for spray booms to fold or pivot in order to extend and retract (especially for booms having considerable length).

One spray boom was made by Pommier. While that boom may work well for its intended purposes, its design may nevertheless be improved upon.

Thus there exists a need for an improved agricultural spray boom that solves these and other problems.

SUMMARY OF THE INVENTION

An improved agricultural spray boom having a primary section, a secondary section and a break away section is provided. The primary section has a top extrusion having a web and two tubes, each tube having a heat sink and a wing. No welds are located above the centerline of the tubes where stress would be the greatest. The secondary section is pivotally attached to the primary section. Weight of the second section and break away section cause a twisting force to be applied to the primary section. The primary section has specially oriented side braces (all in one direction on a first side and on the opposite direction on the second side) which act in compression to resist the twisting force. The primary section further has a steel connector connected to the underside of the extrusions (and not welded to top of extrusions). The secondary section also has a top extrusion with a web and two tubes.

According to one advantage of the present invention, the primary section has two sides and each side has similarly oriented braces that can be parallel or nearly parallel to each other. However, the orientation of the braces is opposite between the sides. This advantageously puts all cross braces in compression during the folding of the secondary section and minimizes twisting of the primary section under the unidirectional loading causes by pivoting of the secondary section and breakaway section.

According to another advantage of the present invention, a connector is provided that is made of steel. The connector plates are connected to the underside of aluminum tubes. The steel plates prevent bolt hole deformation and minimizes the welds at locations which normally are subject to large amounts of stress.

According to a further advantage of the present invention, the tops (respectively) of the primary and secondary sections are extruded and have two tubes joined with a web. Such a design advantageously requires no welds on the top hemisphere above the tube centerline of the tubes while still rigidly joining the tubes together. Related, relative the primary section, the web is located tangent to the top of the tubes to create an uninterrupted and unwelded tension surface across the top and down the sides of both top tubes. Relative the secondary section, the web is located tangent to the top of the tube and the radius.

According to a still further advantage of the present invention, the primary and secondary sections have no welds above the center line or center axis (top hemisphere) of the upper extrusion or below the center line or center axis (bottom hemisphere) of the bottom extrusions. Welds in these locations (if there were any) would be subject to high amount of stress and the present invention avoids such stresses and associated weld fatigue issues. This increases the life span of the boom by eliminating the use of welds in some locations that would otherwise be subject to large amounts of stress.

According to a still further advantage yet of the present invention, the top extrusion of the primary section has thick sections at the bottom outside corners which act as heat sinks in the welding area. The heat sinks reduce the size and intensity of heat affected zones. The top extrusion further has wing ribs at the bottom inside corners. These ribs provide a flat welding area for the diagonal cross tubes.

According to a still further advantage yet of the present invention, in a secondary section, there is a top extrusion having a tube on one side and a top and side wing on the other side. This advantageously provides a wide top profile that can be joined with sheet metal A-frames.

According to a still further advantage yet of the present invention, in a break-away section, the top extrusion has a three sided single wall profile. This advantageously provides a strong yet light weight structure. Additionally, the structure is easily repaired in the field (if necessary) with sheet metal and a welder.

According to a still further advantage yet of the present invention, the tubes of the top and bottom extrusions have internal ribbing. The ribs advantageously add strength to the sections without adding overly-restrictive amounts of cross-sectional weight.

According to a further advantage yet of the present invention, the primary and secondary sections have open bottoms below the riser cross bracing (primary section) and top piece (secondary section). This uninterrupted open space allows for a wide range of spray head locations uncompromised by boom structural supports. Bottom cross member (and plumbing supports) can be chosen and fabricated after the plumbing pattern is selected and can also be easily cut and moved after installation as needed to accommodate plumbing.

According to a still further advantage yet of the present invention, the hinge between the primary section and secondary section is entirely within the boom profile when the boom is in the open position. The boom profile is the outer dimension of the boom. This prevents the hinge from being exposed during use wherein it could become damaged or engaged by a tree or other debris.

According to a still further advantage yet of the present invention, the hinge actuating link pivots close to the actual boom hinge axis. This advantageously provides a more uniform folding speed and force throughout the entire folding movement.

According to a still further advantage yet of the present invention, the hydraulic folding cylinder is closed when the boom is open for spraying. This minimized the exposure (to chemicals and other conditions) to the unpainted cylinder rod.

Other advantages, benefits, and features of the present invention will become apparent to those skilled in the art upon reading the detailed description of the invention and studying the drawings.

DETAILED DESCRIPTION OF PREFERRED EMBODIMENTS

Figure 1:
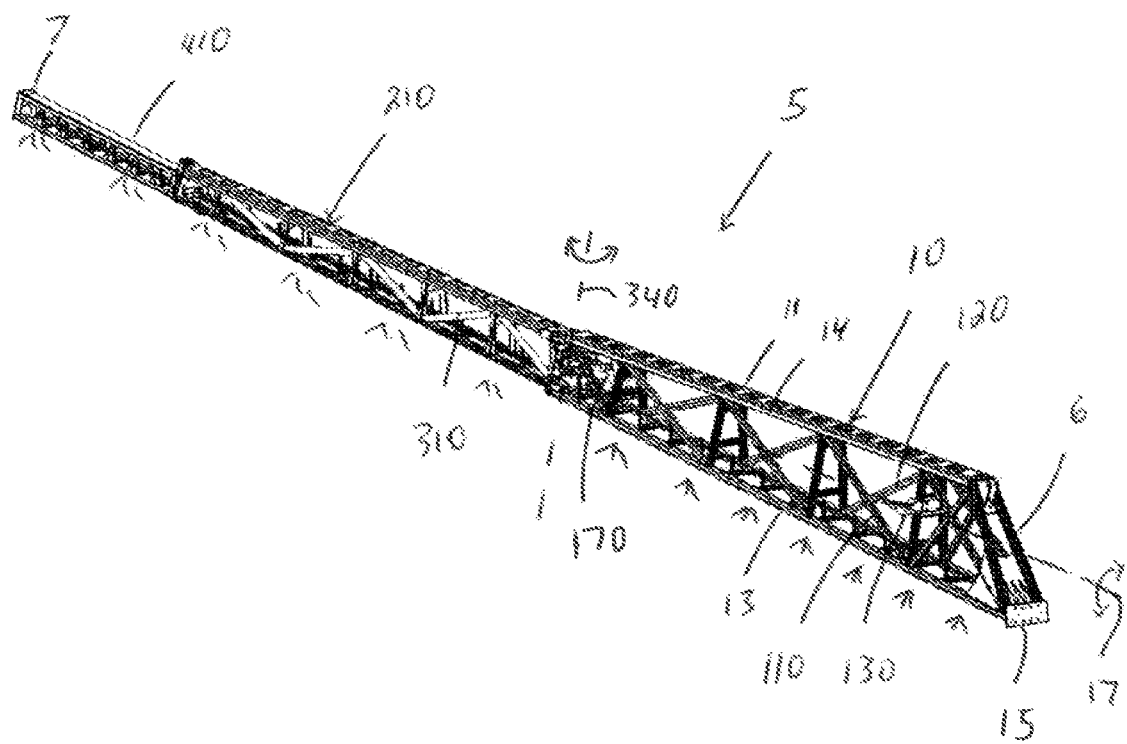
FIG. 1 is a perspective view of a preferred embodiment of the present invention.
Figure 2:
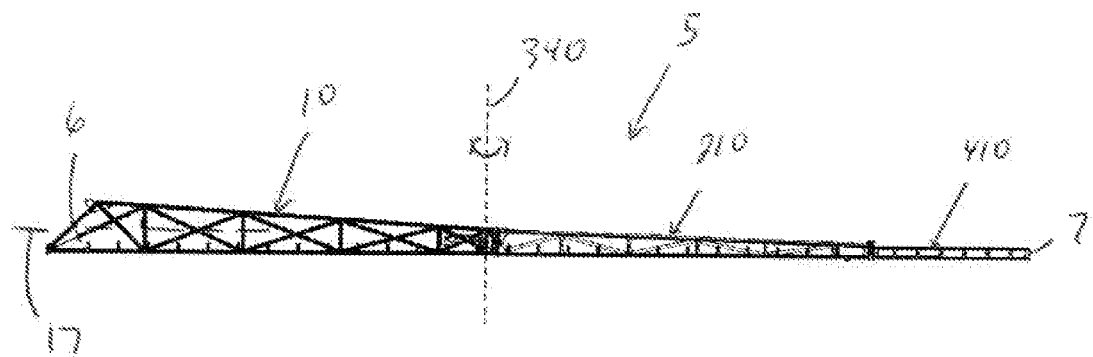
FIG. 2 is a side view of the embodiment illustrated in FIG. 1.
Figure 3:
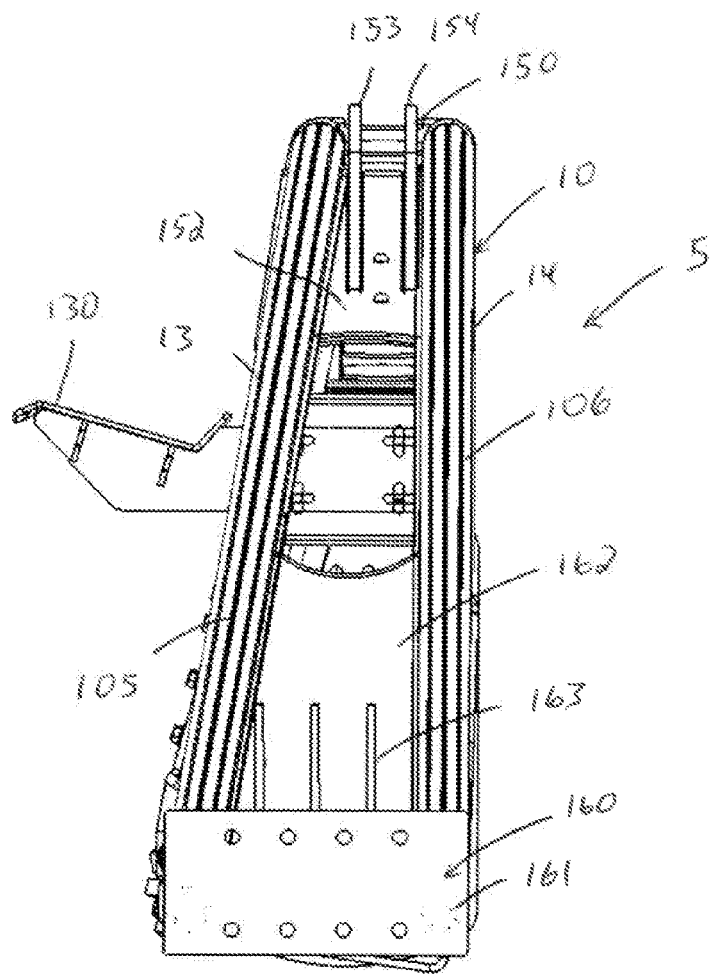
FIG. 3 is a first end view of the embodiment illustrated in FIG. 1.
Figure 4:
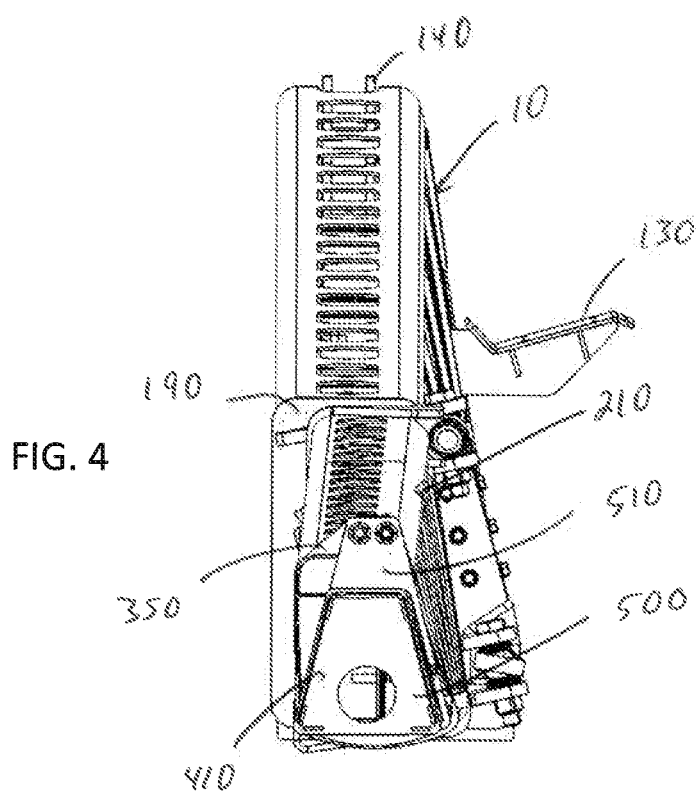
FIG. 4 is a second end view of the embodiment illustrated in FIG. 1.
Figure 5:
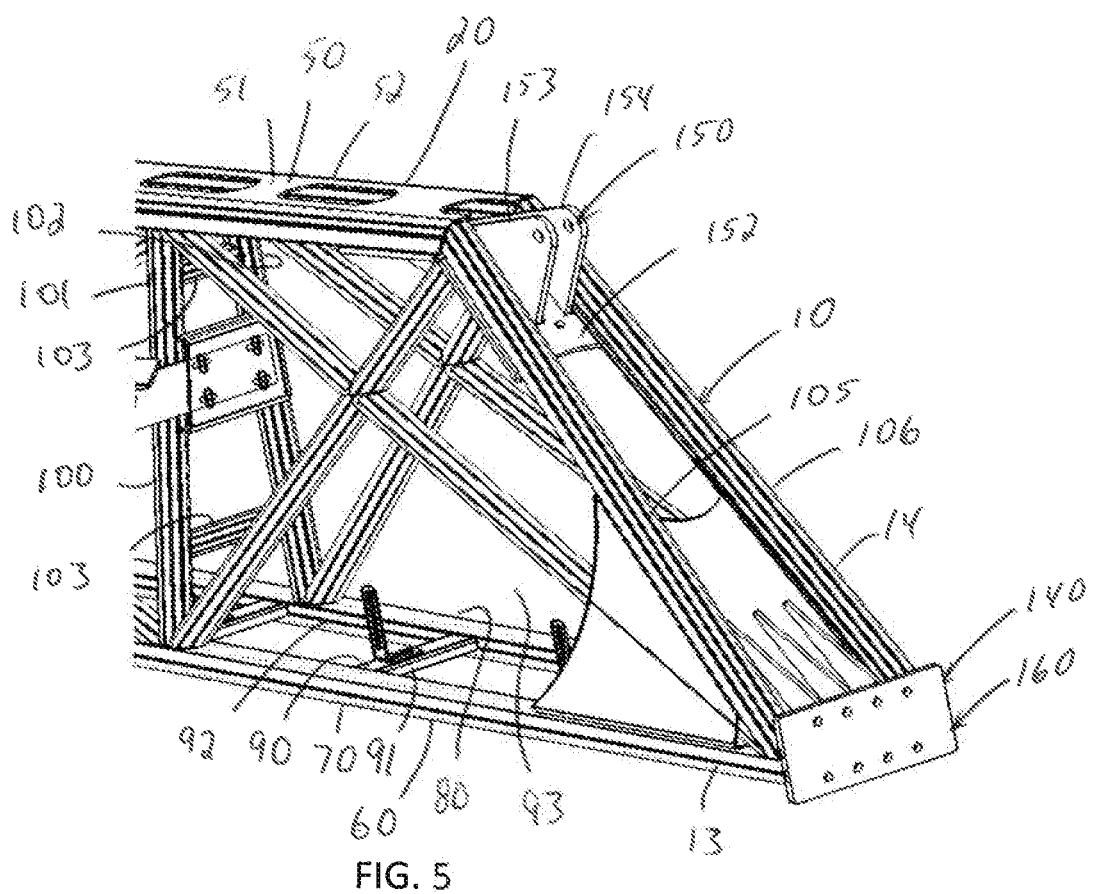
FIG. 5 is close up perspective view of the first end of the boom.
Figure 6:
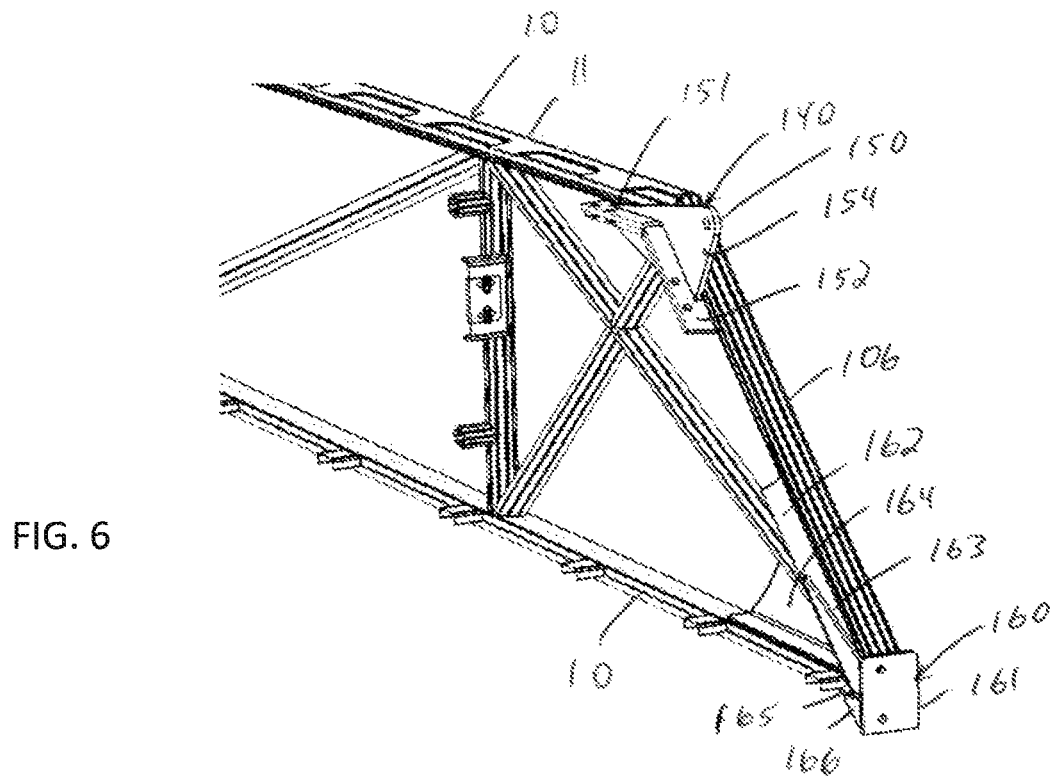
FIG. 6 a cross-sectional view taken along line 6-6 in FIG. 5.
Figure 7:
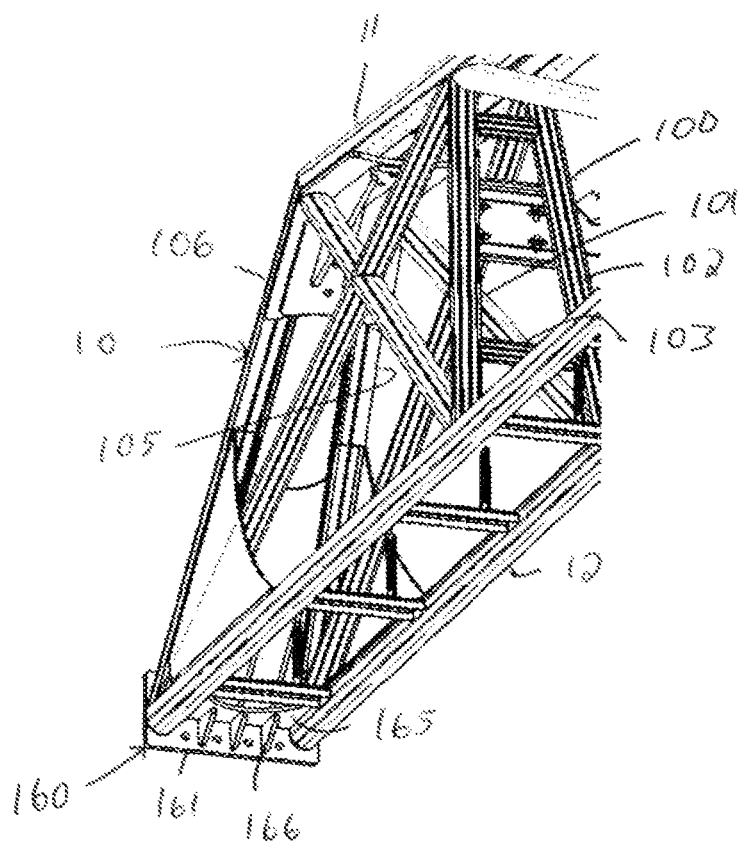
FIG. 7 is a close up perspective view from an alternative view of the first end of the boom.
Figure 8:
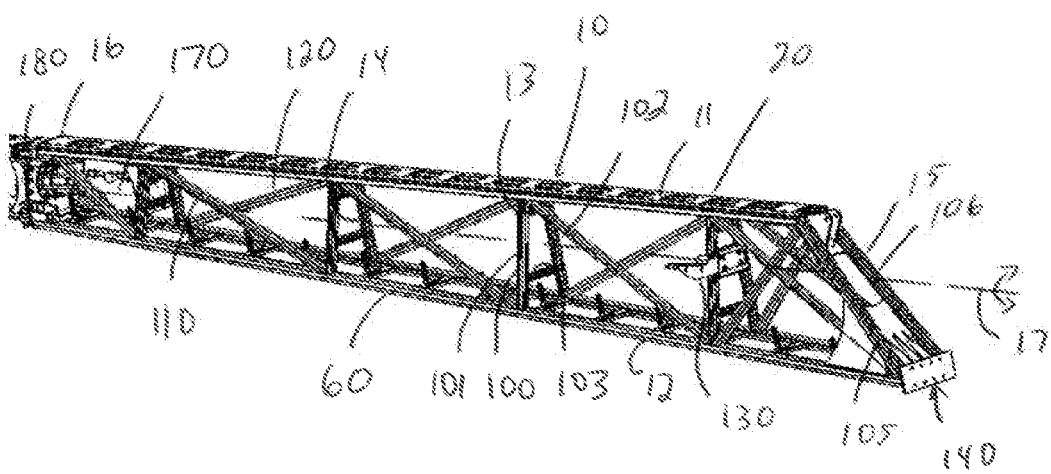
FIG. 8 is a perspective view of the primary section.
Figure 9:
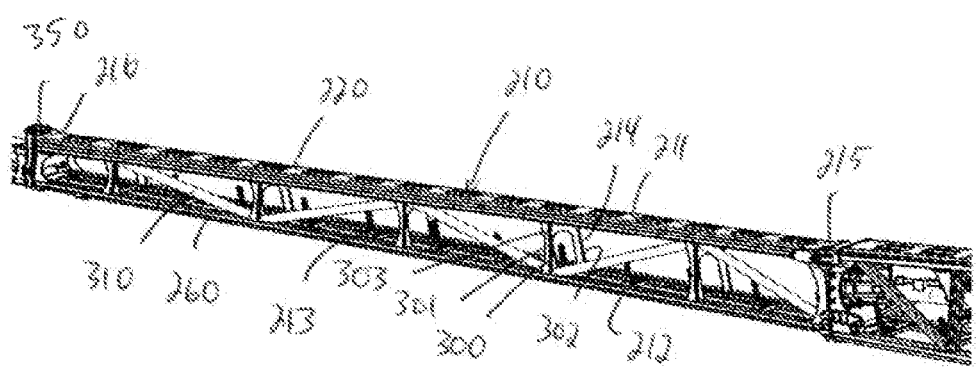
FIG. 9 is a perspective view of the secondary section.
Figure 10:
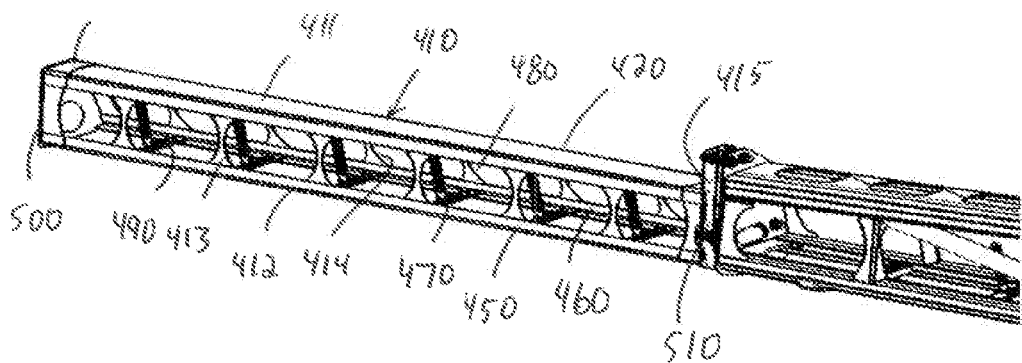
FIG. 10 is a perspective view of the breakaway section.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

An embodiment of the present invention is illustrated in FIGS. 1-26.

Except as noted elsewhere, the boom 5 of the present invention is preferably made of aluminum or aluminum alloy. It is appreciated however that other materials may be used without departing from the broad aspects of the present invention.

The boom 5 has opposed ends 6 and 7. The boom has a boom profile that varies along its length determined by the locations of the outermost portions of the boom. In one embodiment, the boom can have a length of approximately between 100 and 150 feet in length. It is appreciated that the boom 5 could be longer or shorter without departing from the broad aspects of the present invention.

The boom 5 has three sections; namely, a first section (primary section) 10, a second section (folding section relative the primary section) 210 and a third section (breakaway section 410 relative the secondary section). Each of these sections is described in detail below.

The first section 10 has a top 11, a bottom 12, a first side 13, a second side 14, a first end 15 and a second end 16. An axis 17 spans between the first end 15 and the second end 16. The axis is preferably aligned along the geometric center of the section 10.

A top extrusion 20 is provided along the top 11 of the first section 10. The top extrusion 20 has a first tube 30 having internal ribs 31 preferably spanning along the interior length, a heat sink 32 at the lower outside corner, and a wing 33 at the lower inside corner. The top extrusion 20 further has a second tube 40 having internal ribs 41 preferably spanning along the interior length, a heat sink 42 at the lower outside corner, and a wing 43 at the lower inside corner. A web 50 with cross bars 51 separated by openings 52 is further provided. The tubes 30 and 40 have a generally round interior wherein the ribs extend inwardly therefrom. The generally round interiors have a centerline that separates the tubes to having two hemispheres. A centerline 45 is shown as an illustration in FIG. 11. The centerline 45 is at the widest point of the round profile.

Heat sinks 32 and 42 distribute heat away from the tube generated during a welding process. The removal of heat enhances the strength of the welds.

Wings 33 and 43 provide flat areas under the respective tubes wherein other components can be welded to the top extrusion 20.

The web 50 preferably spans from the top of tube 30 to the top of tube 40 tangent to the highest parts of the tubes resulting in smooth continuous feature. The feature can be a tension surface across the web and around the outer sides of tubes 30 and 40. Preferably, no welds are present above the centerline of the tubes (i.e. not located on the top hemispheres of the tubes, respectively).

Bottom extrusions 60 are further provided. The bottom extrusions can comprise a first tube 70 having internal ribs 71 preferably spanning along the interior length, a heat sink 72 at the upper outside corner, and a wing 73 at the upper inside corner. The bottom extrusions are further comprised of a second tube 80 having internal ribs 81 preferably spanning along the interior length, a heat sink 82 at the upper outside corner, and a wing 83 at the upper inside corner. A web 90 can be comprised of cross bars 91 to connect the two tubes 70 and 80. Tubes 70 and 80 preferably have a generally round interior profile with ribs extending inwardly from the inside walls. The cross bars 91 preferably support plumbing mounts 92 and define a plumbing area 93. There are preferably no welds below the center line of the bottom extrusions.

Figure 11:
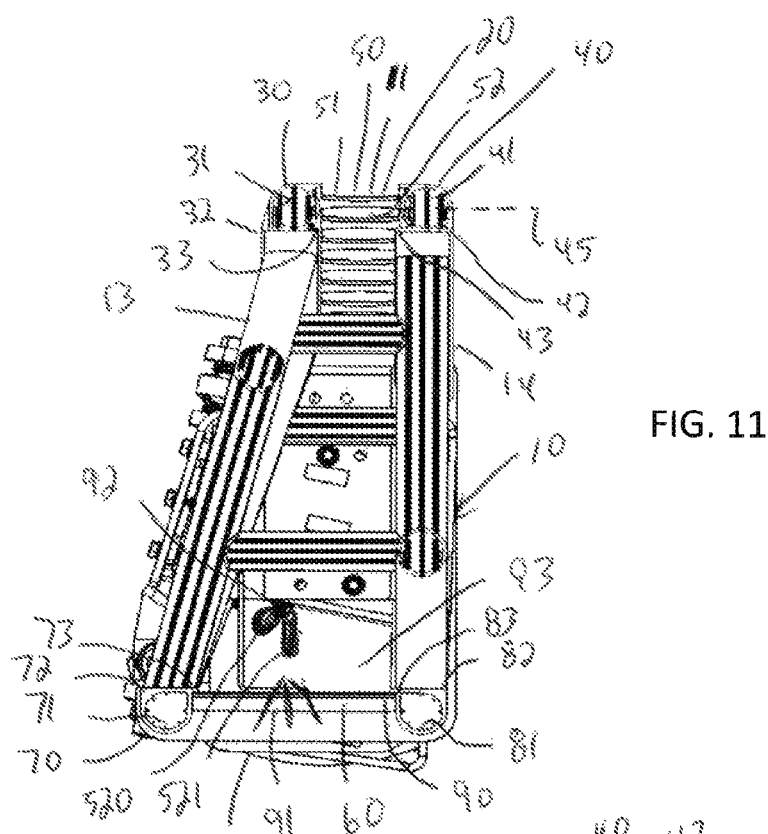
FIG. 11 is a cross-sectional view of the primary section.
Figure 12:
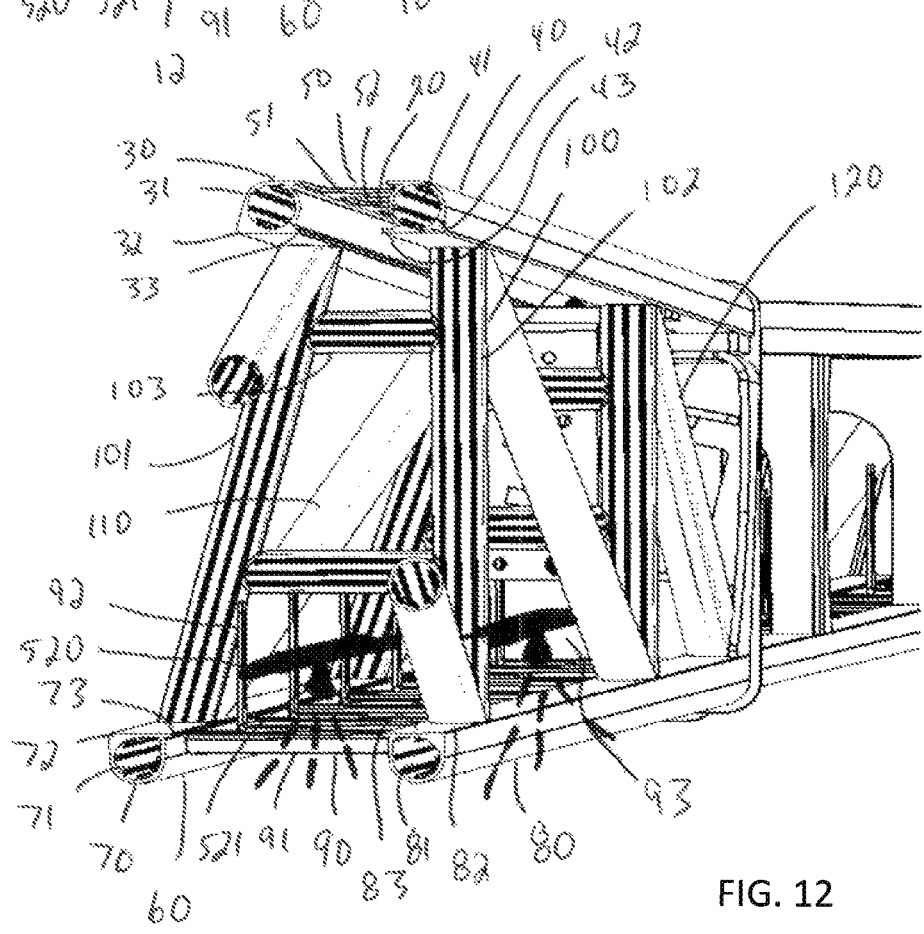
FIG. 12 is a perspective cross-sectional view of the primary section.
Figures 13, 14:
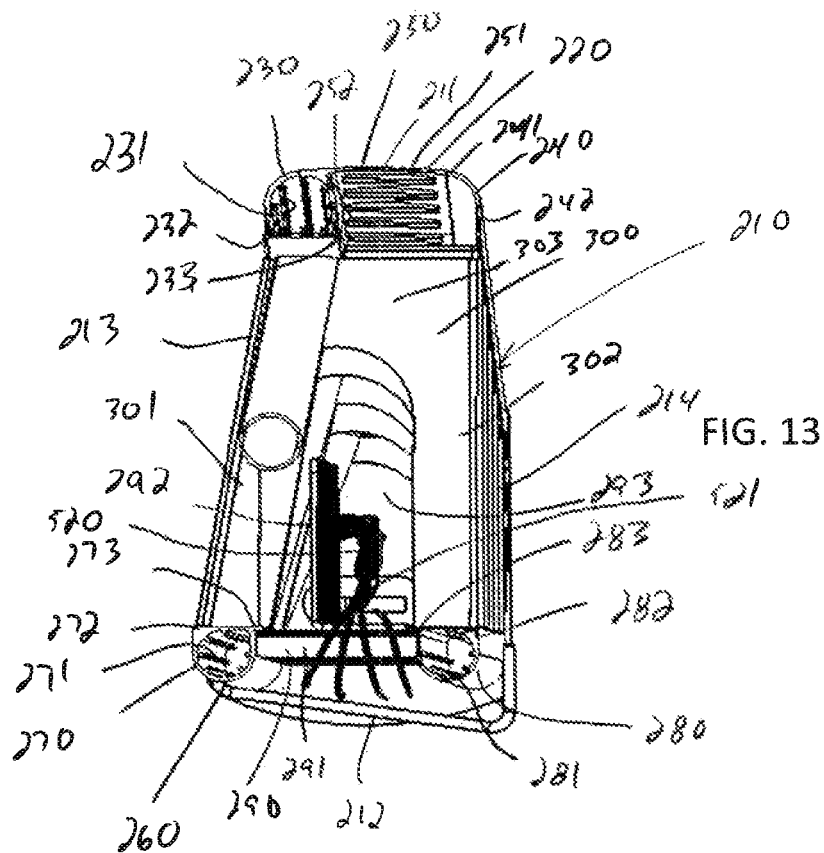
FIG. 13 is a cross-sectional view of the secondary section.
FIG. 14 is a perspective cross-sectional view of the secondary section.
Figure 15:
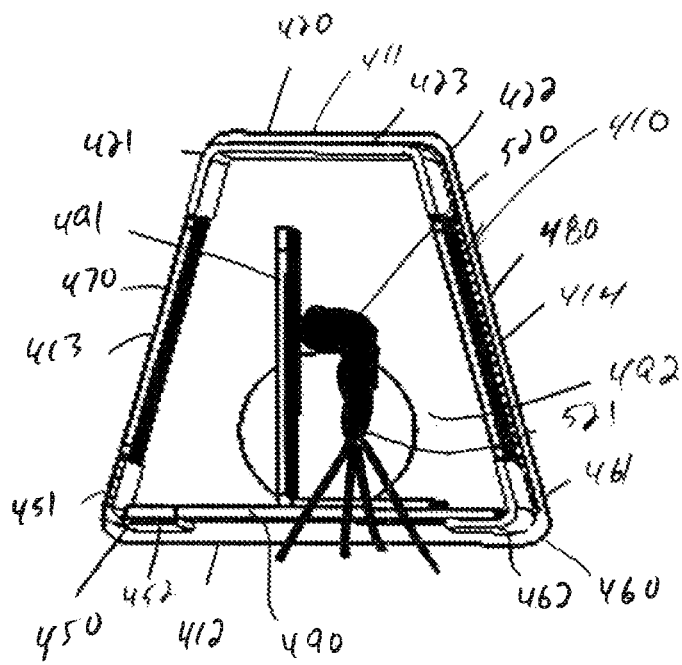
FIG. 15 is a cross-sectional view of the breakaway section.
Figure 16:
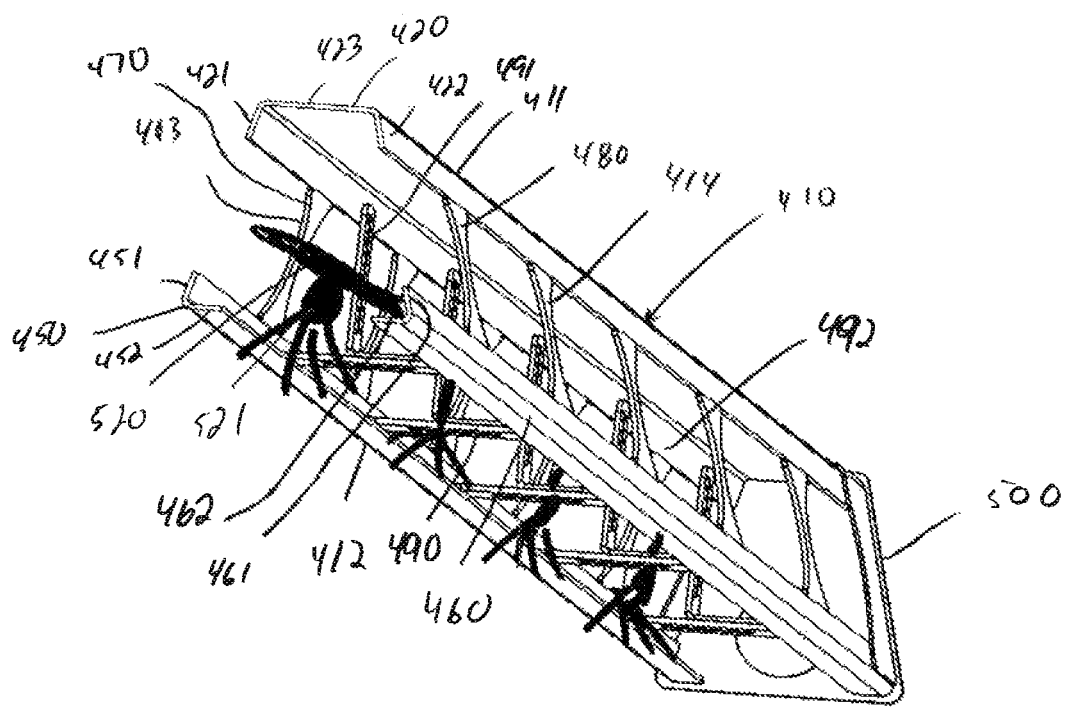
FIG. 16 is a perspective cross-sectional view of the breakaway section.
Figure 17:
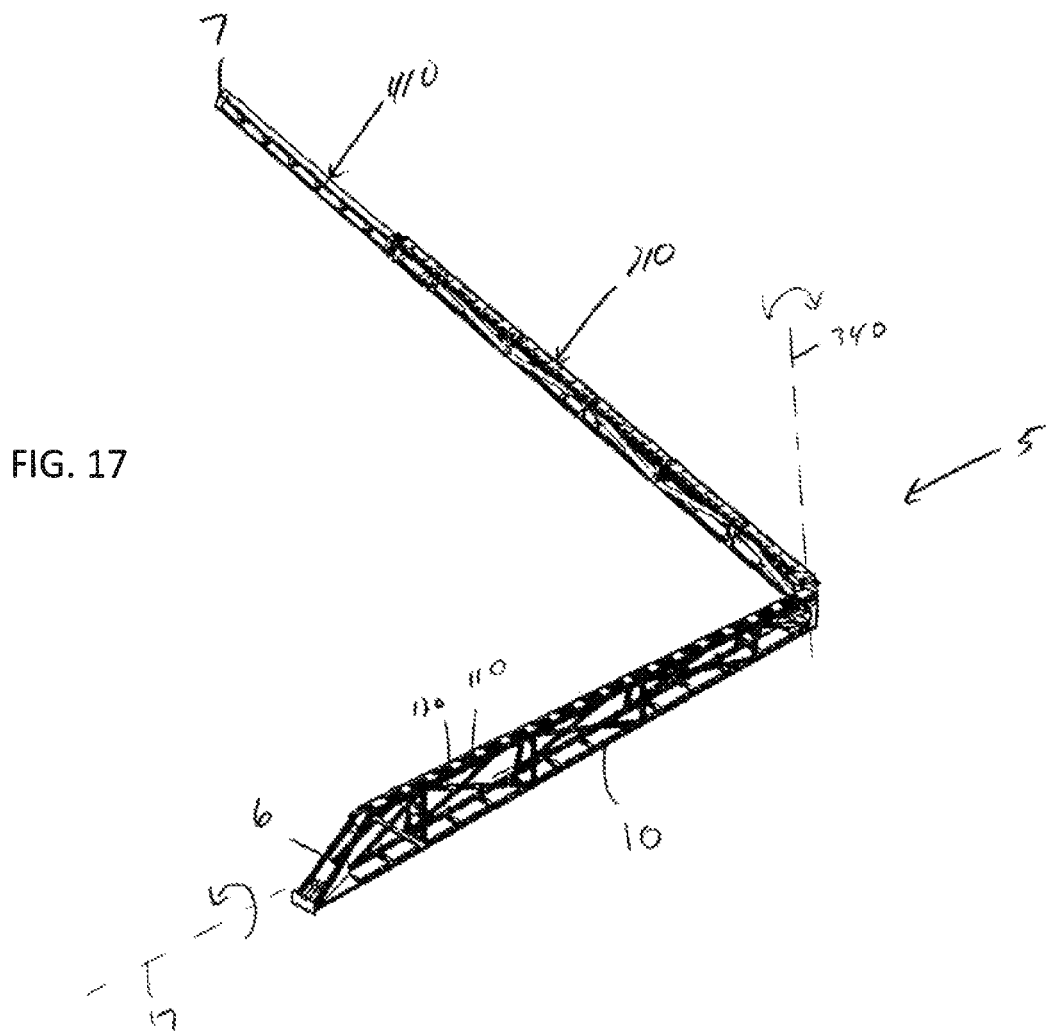
FIG. 17 is a perspective view of the secondary section angled 90 degrees relative the primary section.
Figure 18:
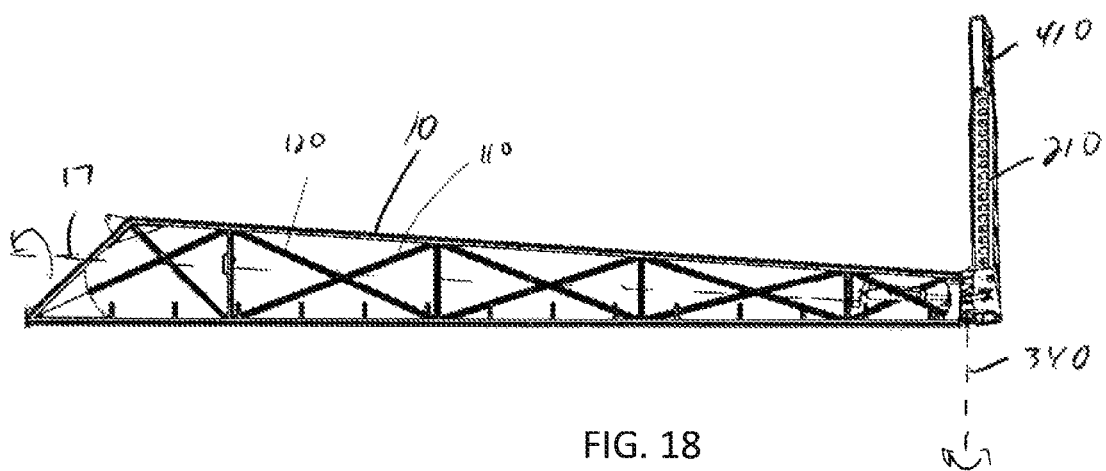
FIG. 18 is an alternative view of the embodiment illustrated in FIG. 17.
Figure 19:
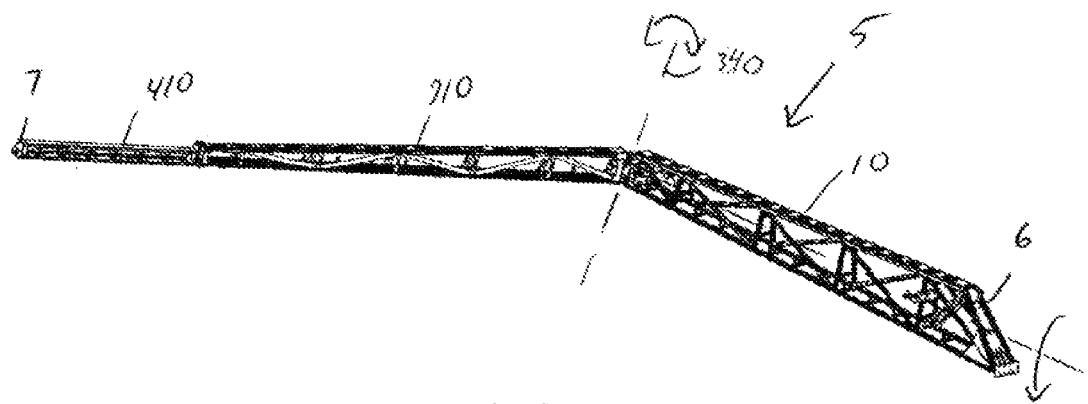
FIG. 19 is an alternative view of the embodiment illustrated in FIG. 17.
Figure 20:
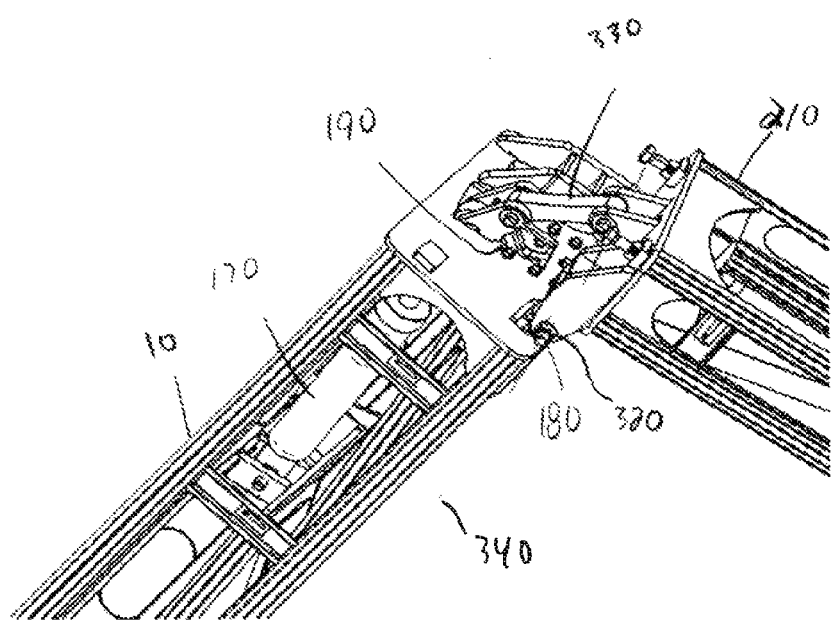
FIG. 20 is a close up view illustrating the pivotal connection between the primary section and the secondary section.
Figure 21:
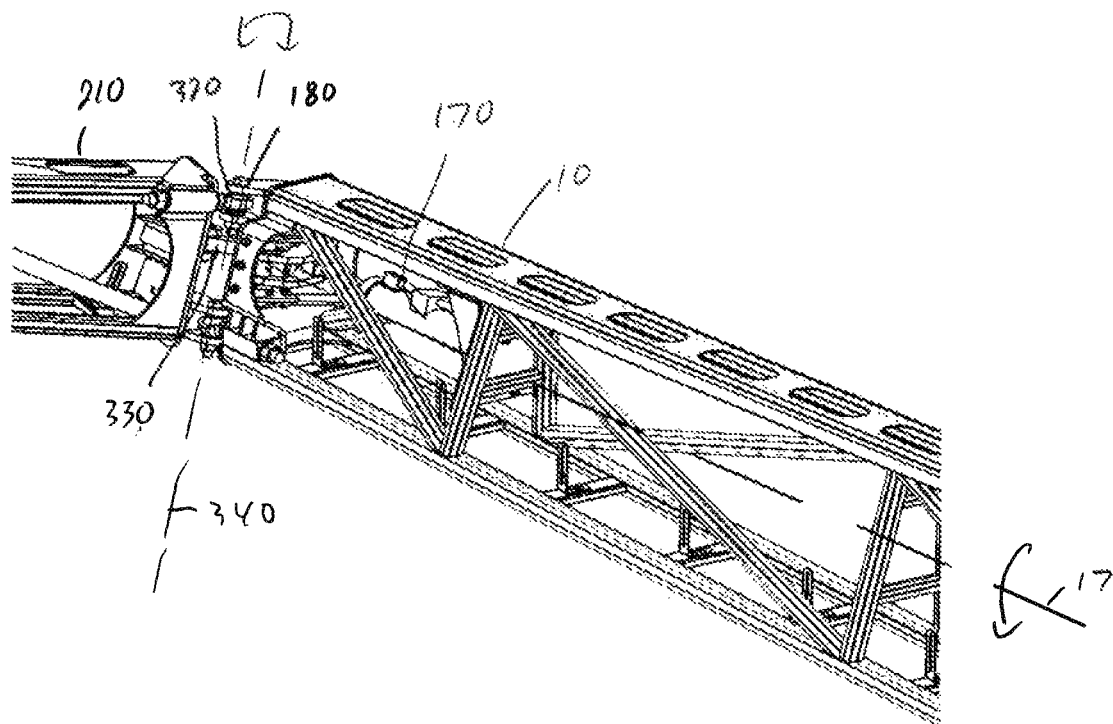
FIG. 21 is a close up view illustrating the pivotal connection between the primary section and the secondary section.
Figure 22:
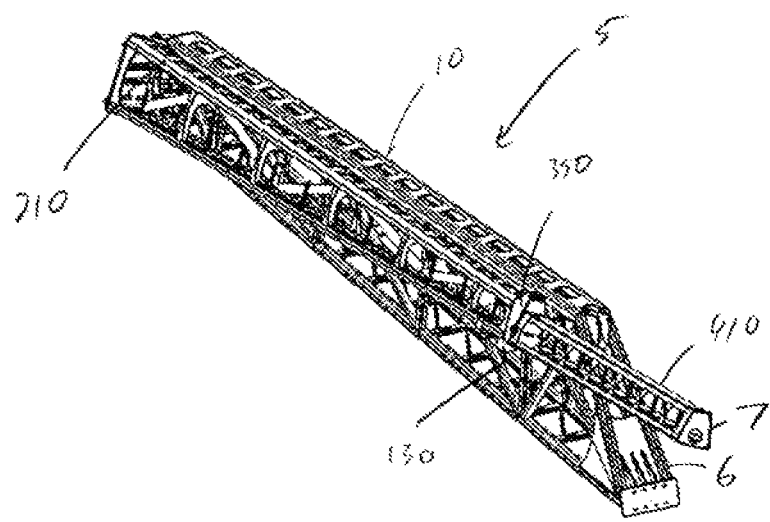
FIG. 22 is a perspective view of the secondary section folded adjacent the primary section.
Figure 23:
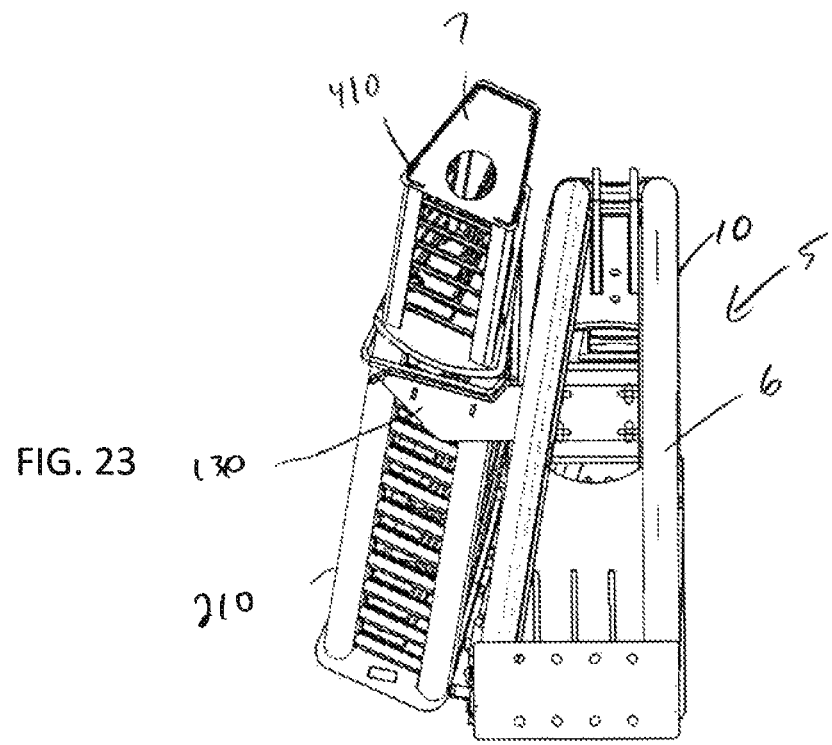
FIG. 23 is an end view of the embodiment illustrated in FIG. 22.
Figure 24:
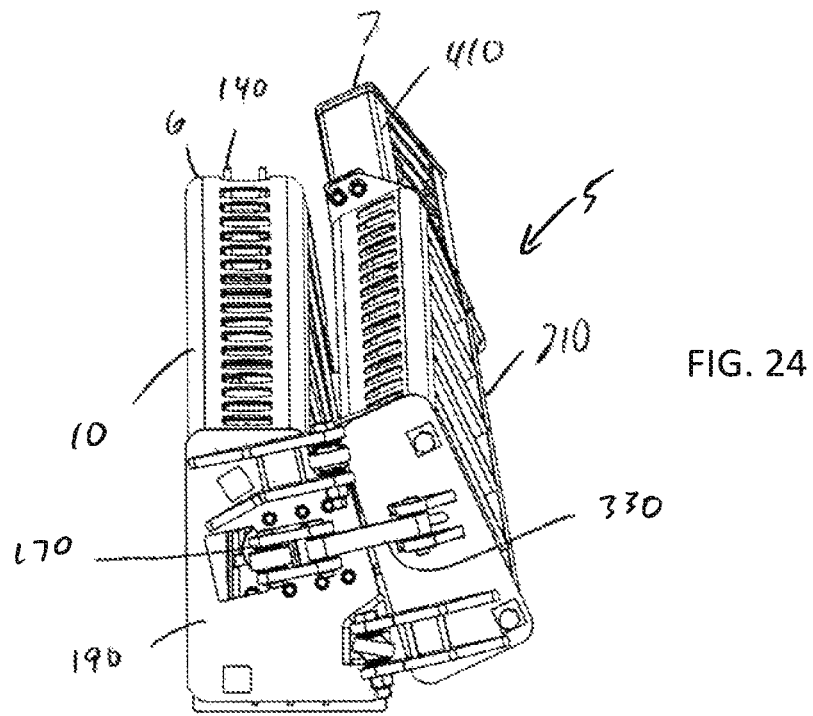
FIG. 24 is an opposite end view of the embodiment illustrated in FIG. 22.
Figure 25:
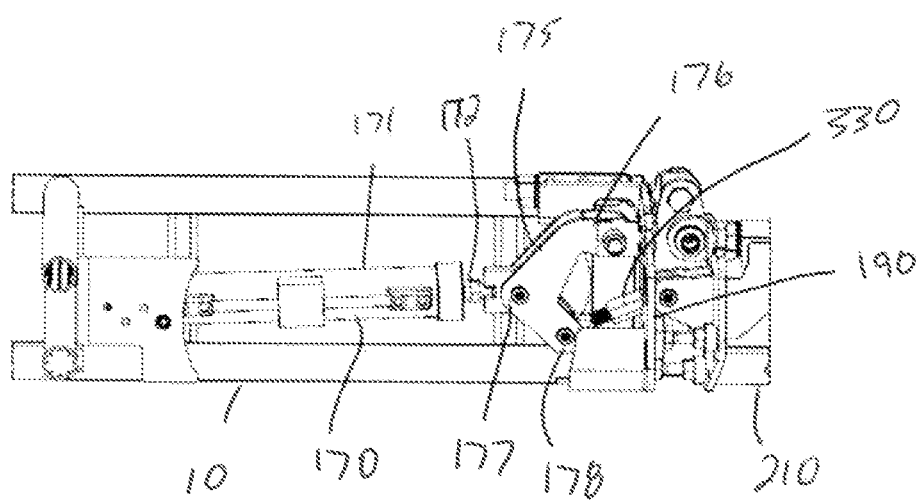
FIG. 25 is a view showing the secondary section in-line with the primary section.
Figure 26:
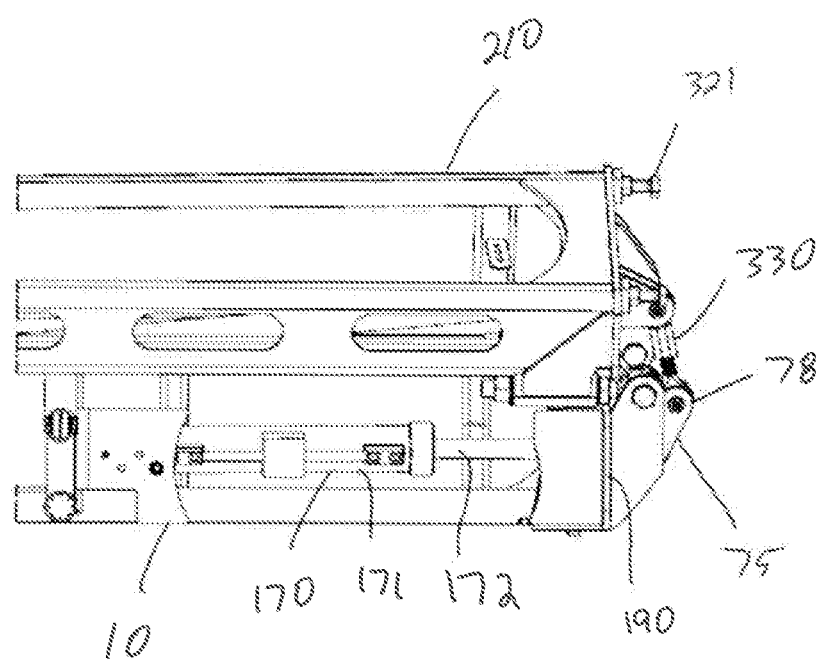
FIG. 26 is a view showing the secondary section folded relative the primary section.

Several riser assemblies 100 are provided. Each riser assembly 100 has a first side bar 101, a second side bar 102 and two cross braces 103 spanning between the side bars. It is best seen in FIGS. 11 and 12 that the first side 13 (with side bar 101) is angled and the second side 14 (with side bar 102) is generally vertical. In this regard, the first section 10 is wider at the bottom and narrower at the top. Each riser assembly 100 is preferably open at the bottom below the bottom cross bracing to allow for the placement of plumbing fixtures at desired locations.

Two end risers 105 and 106 are further provided. Risers 105 and 106 are at the end 15 of the primary section 10 and are angled whereby the bottom extrusions are longer than the top extrusion.

Side braces 110 are on the first side 14 of the boom. The side braces are preferably oriented similarly to each other on the first side of the primary section 10, wherein the top is welded to the wing 33 closer to the second end 16 and the bottom is welded to wing 73 closer to the first end 15 of the section 10. The braces 110 can be parallel or nearly parallel to each other, or may be oriented similarly but be non-parallel.

Braces 110 and 120 can be formed of generally round shaped members each with internal ribbing. However, other shapes and profiles may be utilized without departing from the broad aspects of the present invention.

Side braces 120 are on the second side 15 of the boom. The side braces are preferably oriented similarly to each other on the second side of the primary section 10, wherein the top is welded to the wing 43 closer to the first end 15 and the bottom is welded to the wing 83 closer to the second end of the section 10. The braces 120 can be parallel or nearly parallel to each other, or may be oriented similarly but be non-parallel.

It is appreciated that when a load is applied at end 16 (due to weight of other components 210 and 410 for example when those components are inwardly swung relative section 10), that a unidirectional twisting force is developed within the primary section 10 about axis 17. In this regard, both the side braces 110 and the side braces 120 are in a state of compression under this twisting force.

A seat 130 is further provided, as best seen in FIGS. 1, 3, 4 and 23. The seat 130 supports the second section 210 when the second section is fully retracted against the first section 10.

A connector 140 is further provided. The connector is preferably made of steel or other material having a strength that is greater than aluminum wherein bolts and the like will be less likely to deform or otherwise damage the connector 140.

The connector 140, which is best seen in FIGS. 1, 3 and 5-8, has two portions, namely a pin connector 150 and a bolt connector 160.

The pin connector has a first plate 151, a second plate 152, a first ear 153 and a second ear 154. The first plate is connected to the underside of the top extrusion 20 and the second plate is behind the end risers 105 and 106. The ears 153 and 154 have holes there through for receiving a pin to connect the boom to a machine.

The bolt connector 160 has a bolt plate 161 having several holes there through. A back plate 162 is provided and secured to the section 10 behind end risers 105 and 106. Gussets plates 163 connect the bolt plate 161 to the back plate 162. Side brace plates 163 are provided spanning between the bottom extrusions 60 and the end risers 105 and 106, respectively. A lateral web 165 is behind the bolt plate 161 and is preferably connected thereto in a generally perpendicular manner. Web gussets 166 provide support between the lower portion of the bolt plate 161 and the lateral web 165.

An actuator 170 is further provided, as best seen in FIGS. 1, 8, 9, 18-21 and 25. The actuator is preferably a hydraulic actuator that is fully retracted (closed) when the folding section 210 is fully extended (in line with primary section) wherein a cylinder 172 is within the housing 171 while the boom is in use.

One end of the actuator is pivotally connected to the primary section 10. An actuator mount 175 is provided having a first end 176, a middle portion 177 and a second end 178. The first end 176 of the mount 175 is pivotally connected to the primary section 10. The actuator 175 is pivotally connected to the middle portion 177 of the mount 175. The middle 177 and second end 178 orbit about the first end 176 under operation of the actuator 175. It is seen that the actuator remains within the profile of the boom during the entire stroke.

A hinged connector 180 is further provided, and it defines an axis of rotation.

A slotted plate 190 (having a slot 191 or gap) is still further provided. The slot in the plate 190 provides clearance for the actuator mount 175 during the stroke of the actuator 170 while the second section pivots about the hinged connector 180. Slot 191 is oriented laterally across plate 190 in a direction generally parallel with the swing of the secondary section relative the first section.

Turning now to FIGS. 9, 13, 14 and 18-24, it is seen that a preferred embodiment of the second section 210 is provided. The second section is pivotally movable between an in-line position (use) and a folded position.

The second section 210 has a top 211, a bottom 212, a first side 213, a second side 214, a first end 215 and a second end 216.

A top extrusion 220 is provided along the top 211 of the second section 210. The top extrusion 220 has a tube 230 having internal ribs 231 preferably spanning along the interior length, a heat sink 232 at the lower outside corner, and a wing 233 at the lower inside corner. The heat sink 232 distributes heat away from the tube generated during a welding process. The removal of heat enhances the strength of the welds. The wing 233 provides a flat area under the respective tubes wherein other components can be welded to the top extrusion 220. Tube 230 has a generally round interior profile with ribs extending inwards from the inside wall.

The top extrusion 220 further has a radius 240 having a top 241 and a side 242. A web 250 with cross bars 251 separated by openings 252 is further provided. The web 250 preferably spans from the top of tube 230 to the top of radius 240 tangent to the respective highest parts resulting in smooth continuous feature. Preferably, no welds are present above the centerline of the tube on the top hemisphere. The radius provides a wider dimension at the top of the secondary section 210.

Bottom extrusions 260 are further provided. The bottom extrusions can comprise a first tube 270 having internal ribs 271 preferably spanning along the interior length, a heat sink 272 at the upper outside corner, and a wing 273 at the upper inside corner. The bottom extrusions are further comprised of a second tube 280 having internal ribs 281 preferably spanning along the interior length, a heat sink 282 at the upper outside corner, and a wing 283 at the upper inside corner. A web 290 can be comprised of cross bars 291 to connect the two tubes 270 and 280. The cross bars 291 preferably support plumbing mounts 292 and define a plumbing area 293. Tubes 270 and 280 have generally round interior profiles with ribs extending inwards from the inside walls, respectively.

Several riser assemblies 300 are provided. Each riser assembly 300 has a first side bar 301, a second side bar 302 and a top 303 spanning between the side bars at the top of the assembly. The top 303 is connected to the wing 233 of the top tube 230 and to the bottom of the side 242 of the radius. The bottom of each side 301 and 302 are welded to the wings 273 and 283, respectively, of the bottom extrusions 260. The secondary section 210 is open below the top 303 to accommodate plumbing assemblies.

Side braces 310 are provided on the first side 213 of the secondary section 210. Each of the side braces are similarly oriented, wherein the upper end is connected to wing 233 closer to end 215 and the lower end is connected to wing 273 closer to end 216.

A hinged connector 320 is further provided and can mate with hinged connector 180 of the first section 10. A pivoting transfer bar 330 is further provided between the actuator mount 175 and the second section 210. The bar is pivotally connected to both the actuator mount 175 and the second section 210. The bar 330 allows the force to be applied a distance offset from the end of the actuator 170 wherein the secondary section 210 can be pivoted to be generally parallel and adjacent to the first section 10. An axis of rotation 340 is provided about which the second section pivots relative the first section under operation of the actuator.

One or more adjustable stops 321 are provided allowing the user to adjust the stop of the secondary section relative the primary section.

Both the transfer bar 330 and the mount 175 are passable through the slot 191 of the slotted plat 190 as the actuator extends and retracts. For example, in FIG. 25 the secondary section is shown in line with the primary section. The actuator is fully retracted and the transfer bar 330 is seen passing through the plate 190. To the contrary, in FIG. 26, the secondary section is shown in the folded position relative the primary section. The actuator is fully extended and the actuator mount 175 passes through plate 190.

Turning now to FIGS. 1, 2, 4, 10, 15-19 and 22-24 it is seen that a third section is provided. The breakaway section (third section) 410 has a top 411, a bottom 412, a first side 413, a second side 414, a first end 415 and a second end 416.

A top extrusion 420 is provided and formed of two sides 421 and 422, respectively, and a top web 423 spanning between the sides. The web 423 and sides 421 and 422 are preferably continuously and integrally formed.

A first bottom extrusion 450 with a side 451 and bottom 452 is provided. The extrusion is preferably on the first side 413 of the section 410. A second bottom extrusion 460 with a side 461 and a bottom 462 is also provided. The second extrusion 460 is preferably on the second side 414 of the section 410.

Side pieces 470 are on the first side 413 of the section 410, and span between the first side 421 of the top extrusion and the first bottom extrusion 450. The side pieces 470 preferably are wider at the top and bottom and are narrower in the mid-section.

Side pieces 480 are on the second side 414 of the section 410, and span between the second side 422 of the top extrusion and the second bottom extrusion 460. The side pieces 480 preferably are wider at the top and bottom and are narrower in the mid-section.

Bottom cross braces 490 are further provided and span between the bottom extrusions 450 and 460. The braces 490 are preferably welded to the bottoms 452 and 462 of the bottom extrusions. Cross braces 490 support plumbing mounts 491 and define a plumbing area 492.

An end piece 500 is at the second end 416 of the breakaway section. A bolt-on piece 510 is at the first end 415 of the section 410. The bolt-on piece 510 is removably connected to the end 216 of the secondary section 210.

A plumbing assembly 520 is provided. The plumbing assembly has a tube and nozzles 521 to distribute materials from the boom 5.

Thus it is apparent that there has been provided, in accordance with the invention, an improved agricultural spray boom that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:
1. A boom comprising:
a primary section having a primary section first side and a primary section second side, a plurality of first side braces being oriented generally in a first direction with an upward slope on said primary section first side, said plurality of first side braces being separated by first vertically disposed risers and being without any intervening downward sloped first side braces, and a plurality of second side braces being successively oriented generally in a second direction with a downward slope on said primary section second side, said plurality of second side braces being separated by second vertically disposed risers and being without any intervening upward sloped second side braces;
a secondary section pivotally connected to said primary section movable between a folded position and an in-line position,
wherein said plurality of first side braces and said plurality of second side braces cooperate to prevent twisting of said primary section by acting in compression.

2. The boom of claim 1 wherein said primary section has a top extrusion comprising:
a top extrusion first tube;
a top extrusion second tube; and
a top extrusion web between said top extrusion first tube and said top extrusion second tube.

3. The boom of claim 2 wherein:
said top extrusion first tube has a top extrusion first tube top;
said top extrusion second tube has a top extrusion second tube top; and
said top extrusion web is integral with and spans between said top extrusion first tube top and said top extrusion second tube top, wherein a continuous surface is formed by said top extrusion first tube top, said top extrusion web and said to extrusion second tube top.

4. The boom of claim 3 wherein said top extrusion first tube and a top extrusion first tube top hemisphere that is free of any welds and said continuous surface is tangent to a center point of said top extrusion first tube top hemisphere.

5. The boom of claim 3 wherein said top extrusion web, said top extrusion first tube and said top extrusion second tube form a tension surface.

6. The boom of claim 3 wherein:
said top extrusion first tube comprises a top extrusion first tube heat sink and a top extrusion first tube wing, said top extrusion first tube wing being located at a lower corner of said top extrusion first tube forming a top extrusion first tube flat area; and said top extrusion second tube comprises a top extrusion second tube heat sink and a top extrusion second tube wing, said top extrusion second tube wing being located at a lower corner of said top extrusion second tube and forming a top extrusion second tube flat area.

7. The boom of claim 1 wherein:
said primary section further comprises a primary section top, a primary section bottom and a primary section end; and
said boom further comprises a connector mounted to said primary section from behind said primary section end.

8. The boom of claim 7 wherein:
said primary section end has a first end riser and a second end riser, said first end riser having a first end riser underside and said second end riser having a second end riser underside;
said connector comprises:
  a pin connector having a first plate located behind and mounted to said first end riser underside and to said second end riser underside; and
  a bolt connector having a back plate located behind and mounted to said first end riser underside and said second end riser underside.

9. The boom of claim 1 further comprising an actuator having a housing and a cylinder, said cylinder being retracted within said housing when said secondary section is in said in-line position relative to said primary section, said boom further having an actuator mount with a middle portion connected to said actuator, a first end connected to said primary section and a second end connected to a transfer bar.

10. The boom of claim 1 further comprising a breakaway section, said breakaway section comprising a three sided single wall extrusion.

11. A boom comprising:
a primary section having:
  a primary section top;
  a primary section bottom;
  a primary section first end with a first end riser and a second end riser, said first end riser having a first end riser underside and said second end riser having a second end riser underside; and
  a primary section second end,
a secondary section connected to said primary section at said primary section second end;
a connector at said primary section first end being located behind and connected to said first end riser underside and to said second end riser underside, wherein said connector comprises:
  a pin connector having a first plate located behind and mounted to said first end riser underside and to said second end riser underside; and
  a bolt connector having a back plate located behind and mounted to said first end riser underside and to said second end riser underside.

12. The boom of claim 11 wherein said connector connected to said primary section below said primary section top.

13. The boom of claim 11 wherein said bolt connector is connected to said primary section at said primary section bottom and has a bolt and a gusset between said bolt plate and said back plate.

14. The boom of claim 13 wherein said bolt connector further comprises a lateral web behind said bolt plate and a web gusset.

15. A boom comprising:
a primary section having:
  a primary section first end;
  a primary section second end;
  an actuator pivotally connected to said primary section, said actuator having a housing and a shaft; and
  an actuator mount having an actuator mount first end, and actuator mount second end and an actuator mount middle portion, said actuator mount first end being connected to said primary section and said actuator mount middle portion being connected to said actuator; and
a secondary section having:
  a secondary section first end;
  a secondary section second end; and
  a transfer bar, said transfer bar being connected to said actuator mount at said actuator mount second end and to said secondary section first end;
wherein said secondary section is pivotal relative to said primary section under operation of said actuator between a folded position and an in-line position about a pivot axis,
wherein said actuator mount second end orbits about said actuator mount first end under operation of said actuator, and
wherein said primary section has a clotted plate at said primary section second end, and said actuator mount second end is passable through said slotted plate through a slot, said slot having a slot longitudinal axis that is oriented generally perpendicular to said pivot axis between said primary section and said secondary section, said actuator mount being movable along said slot longitudinal axis when said secondary section is pivoted relative to said primary section.

16. The boom of claim 15 wherein said shaft is retracted within said housing when said secondary section is in said in-line position.

17. The boom of claim 15 wherein said primary section further has a primary section first side and a primary section second side, a plurality of first side braces being oriented generally in a first direction on said primary section first side, and a plurality of second side braces being oriented generally in a second direction on said primary section second side, said second direction being different than said first direction.

18. A boom comprising:
a primary section having a primary section first side and a primary section second side, a plurality of first side braces being successively oriented generally in a first direction on said primary section first side, and a plurality of second side braces being successively oriented generally in a second direction on said primary section second side, said first direction being different than said second direction;
a secondary section pivotally connected to said primary section movable between a folded position and an in-line position,
wherein:
said plurality of first side braces and said plurality of second side braces cooperate to prevent twisting of said primary section by acting in compression;
said primary section further comprises a primary section top, a primary section bottom and a primary section end;
said boom further comprises a connector mounted to said primary section from behind said primary section end;

said primary section end has a first end riser and a second end riser, said first end riser having a first end riser underside and said second end riser having a second end riser underside; and said connector comprises:
    a pin connector having a first plate located behind and mounted to said first end riser underside and to said second end riser underside; and
    a bolt connector having a back plate located behind and mounted to said first end riser underside and to said second end riser underside.

\* \* \* \* \*